United States Patent [19]

Yoshida

[11] Patent Number: 4,781,095
[45] Date of Patent: Nov. 1, 1988

[54] PUSHER

[75] Inventor: Minoru Yoshida, Nagoya, Japan

[73] Assignee: Kabushiki Kaisha Yoshida Shokai, Japan

[21] Appl. No.: 928,687

[22] Filed: Nov. 7, 1986

Related U.S. Application Data

[63] Continuation of Ser. No. 696,093, Jan. 28, 1985, abandoned.

[51] Int. Cl.$^4$ .................. B26D 1/24; F15B 7/00
[52] U.S. Cl. ........................ 83/502; 60/567; 60/581; 60/583; 60/594; 83/664; 83/700
[58] Field of Search ............... 60/533, 581, 583, 594, 60/567; 83/502

[56] References Cited

U.S. PATENT DOCUMENTS

| | | | |
|---|---|---|---|
| 154,366 | 8/1874 | Biddle | 60/583 |
| 966,750 | 8/1910 | Hunt | 60/583 |
| 1,367,857 | 2/1921 | Brocke | 60/594 |
| 2,240,287 | 4/1941 | Croll, Jr. | 60/583 |
| 2,344,473 | 3/1944 | Stevenson | 60/594 |
| 3,213,625 | 10/1965 | Worthen | 60/594 |
| 3,357,182 | 12/1967 | Jacoby | 60/594 |
| 3,611,517 | 10/1971 | Giersberg | 60/581 |
| 3,769,794 | 11/1973 | Cachon | 60/594 |
| 4,373,334 | 2/1983 | Carlander | 60/594 |
| 4,526,169 | 7/1985 | Narishige | 60/594 |

FOREIGN PATENT DOCUMENTS 142016 8/1984 Japan .

*Primary Examiner*—Abraham Hershkovitz
*Attorney, Agent, or Firm*—Mason, Fenwick & Lawrence

[57] ABSTRACT

A pusher comprises a body with a plurality of piston holes provided on a front surface thereof, pistons slidably fitted to the piston holes and each having a front end extending in front of the body, an oil passage provided in the body and communicated with a bottom portion of each piston hole, a pressure chamber provided in the body and communicated with the oil passage, a threaded shaft threadably fitted to a threaded hole which is provided in the body and communicated with the pressure chamber, and oil filled in the bottom portion of each piston hole, the oil passage and the pressure chamber, where the piston is adapted to be pushed in front of the body by the threadable advancing of the threaded shaft at force larger than the advancing force of the threaded shaft.

6 Claims, 5 Drawing Sheets

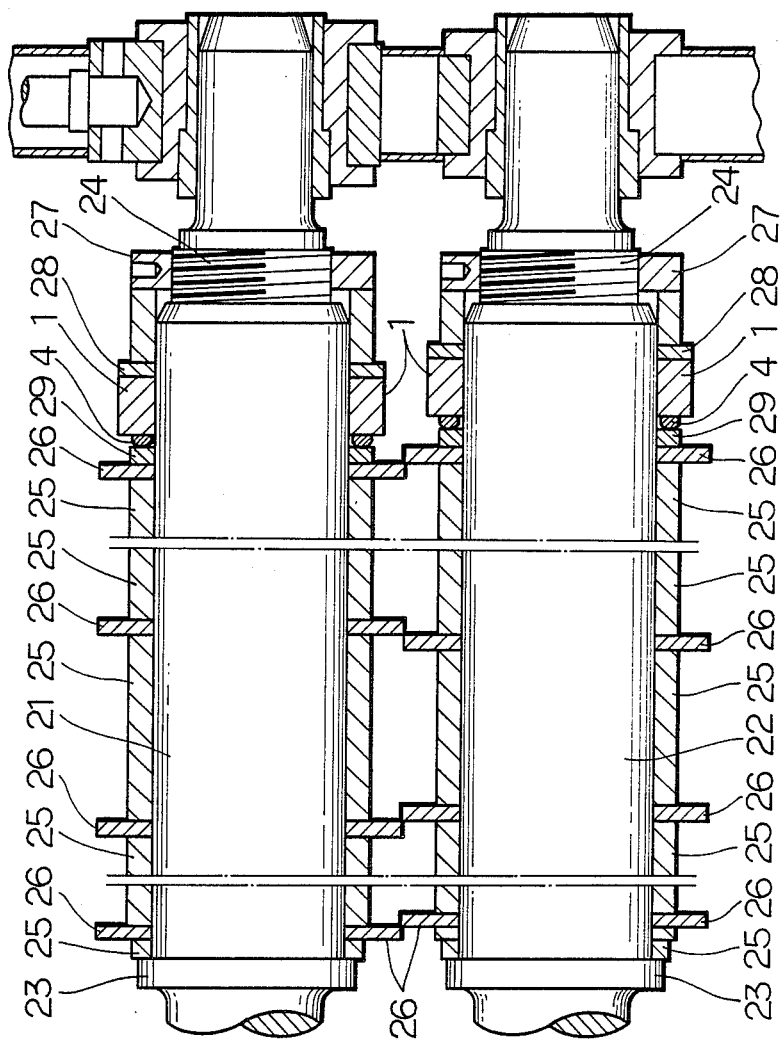

PUSHER

This application is a continuation of application Ser. No. 696,093, filed Jan. 28, 1985 now abandoned.

BACKGROUND OF THE INVENTION

The present invention relates to a pusher which pushes such an object as parts and a work of a machine uniformly using front end of a plurality of pistons projecting at its front surface.

In a conventional steel plate slitter to cut a wide band steel plate into a plurality of narrow band steel plates, as shown in FIG. 1, two arbors 21, 22, are arranged in parallel on the vertical plane and each of the arbors 21, 22 is provided with a slipping-proof part 23 of large diameter at one end and a threaded part 24 of small diameter at other end. Annular or cylindrical spacers 25 and annular plate form cutters 26 are fitted to each of the arbors 21, 22 and a nut 27 threadably engaged with the threaded part 24 of each of the arbors 21, 22 is tightened, so that a plurality of the spacers 25 and a plurality of the cutters 26 are grasped between the nut 27 and slipping-proof part 23 of each of the arbors 21, 22 and a plurality of the cutters 26 are mounted on required positions of each of the arbors 21, 22 and bottom end of each cutter 26 of the arbor 21 on upper side and top end of each cutter 26 of the arbor 22 on lower side are spaced by a required gap.

In this constitution, however, since the cutter 26 are tightened by the nut 27 threadably engaged with the threaded part 24 of the arbor, if threads of the nut 27 and/or the threaded part 24 are not accurately finished or if spacer abutting surface of the nut 27 and/or cutter abutting surface of the spacer 25 are not perpendicular to the arbor axial direction but slanted, the abutting surface of the cutter 26 with the spacer 25 is not uniformly pushed and the cutter 26 is not perpendicular to the arbor axial direction but slanted thereto. If the cutter 26 is slanted, the cutting line of the steel plate is not linear but meanders.

Since the nut 27 threadably engaged with the threaded part 24 of the arbor abuts on the spacer 25, large force is required to tighten the nut 27 and therefore it is very difficult to increase the pushing force against the cutter 26 and much trouble is required to adjust the gap between the upper and lower cutters 26, 26. If the gap between the upper and lower cutters 26, 26 is not suitable, the cutting of the steel plate is not performed smoothly thereby burr may be produced at the cutting surface of the steel plate. Moreover, if pushing force or tightening force of the cutter 26 is small, the cutter 26 is loosened and trouble to adjust the gap is required again.

SUMMARY OF THE INVENTION

In view of above-mentioned circumstances in the prior art, an object of the invention is to provide a pusher which can easily push such an object as parts and a work of a machine uniformly with large force.

The invention is in a pusher where a plurality of piston holes are formed on front surface of a body, pistons are slidably fitted to the piston holes and front end of each piston extends in front of the body, the body is provided with an oil passage communicated with bottom of each piston hole, a pressure chamber communicated with the oil passage and a threaded hole communicated with the pressure chamber, a threaded shaft is threadably fitted to the threaded hole, and oil is fitted in the bottom of each piston hole, the oil passage is filled and the pressure chamber, thereby when the threaded shaft is threadably advanced the piston can be pushed in front of the body by force larger than that advancing the threaded shaft.

In the pusher, since each piston is supported by oil in the oil passage communicated with the bottom of each piston hole, even if a piston abutting surface of an object which abuts on the front end of each piston extending in front of the body is slanted or uneven, the pistons move forwards or rearwards and position of each piston abutting on the object is adjusted thereby each piston abuts on the object uniformly so as to push the object uniformly. Moreover, as the threaded shaft is threadably advanced the piston is pushed by force larger than the advancing force of the threaded shaft and therefore it is easy to increase the pushing force of the piston. In conclusion, the pusher of the invention can easily push the object using the pistons uniformly with large force.

BRIEF DESCRIPTION OF THE DRAWINGS

FIG. 6 is a front view partly in section of a steel plate slitter using the pusher of the embodiment.

DETAILED DESCRIPTION OF THE PREFERRED EMBODIMENT

Figure 2:
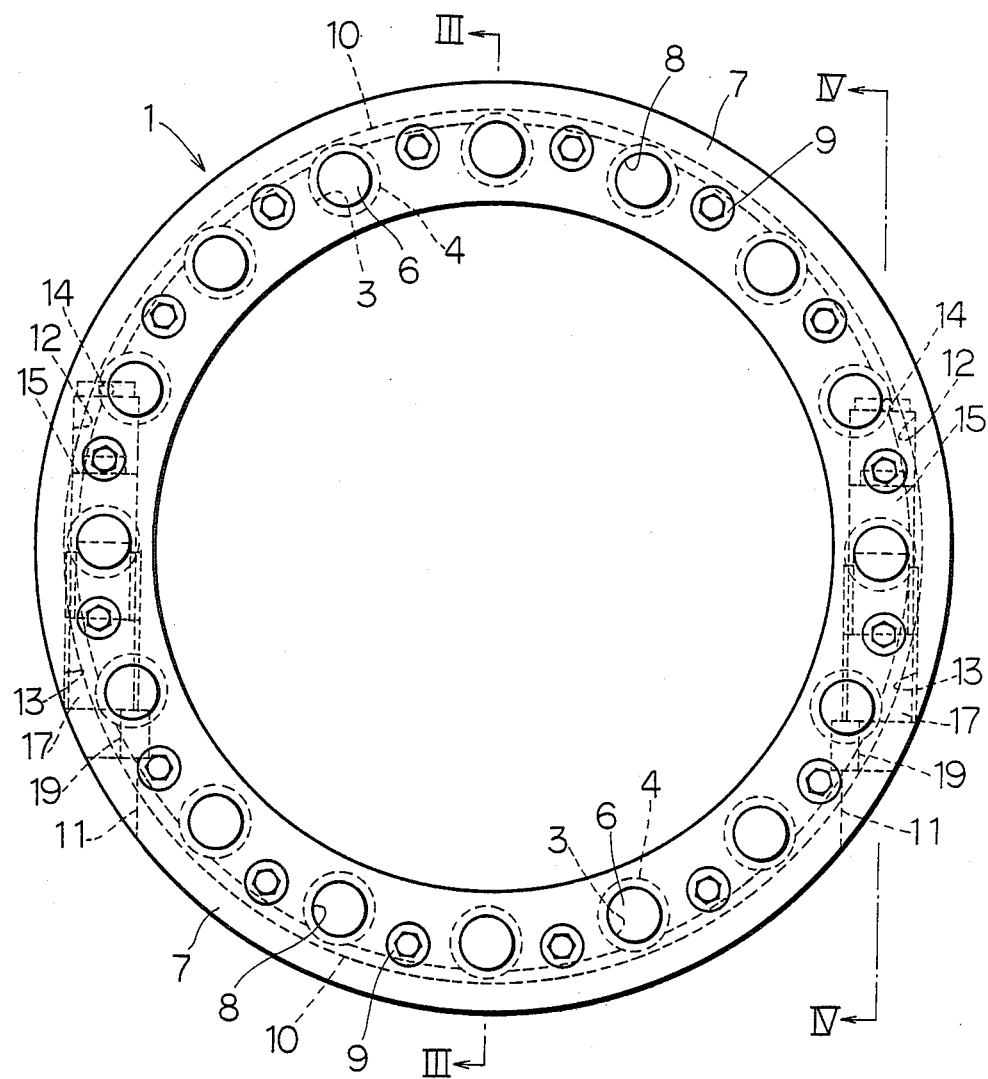
FIG. 2 is a front view of a pusher as an embodiment of the invention.
Figure 3:
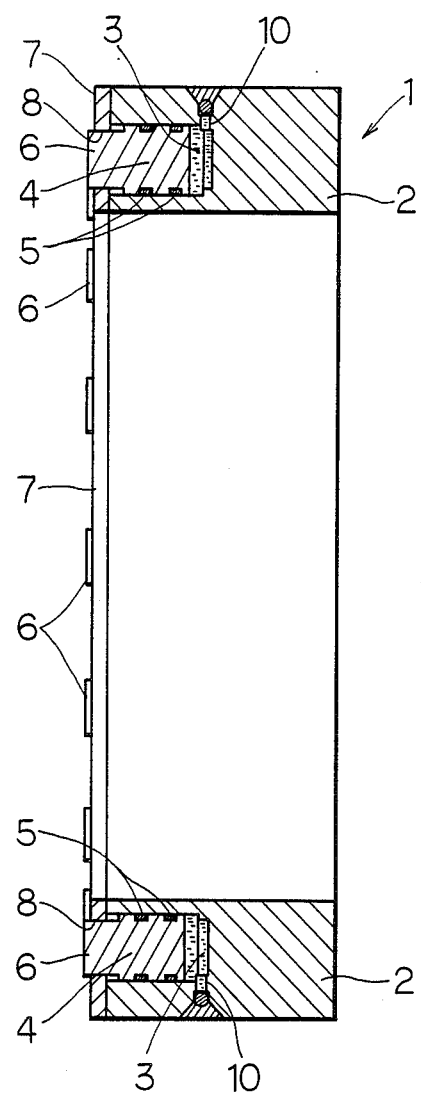
FIG. 3 is a sectional view taken in line II—II of FIG. 2.
Figure 4:
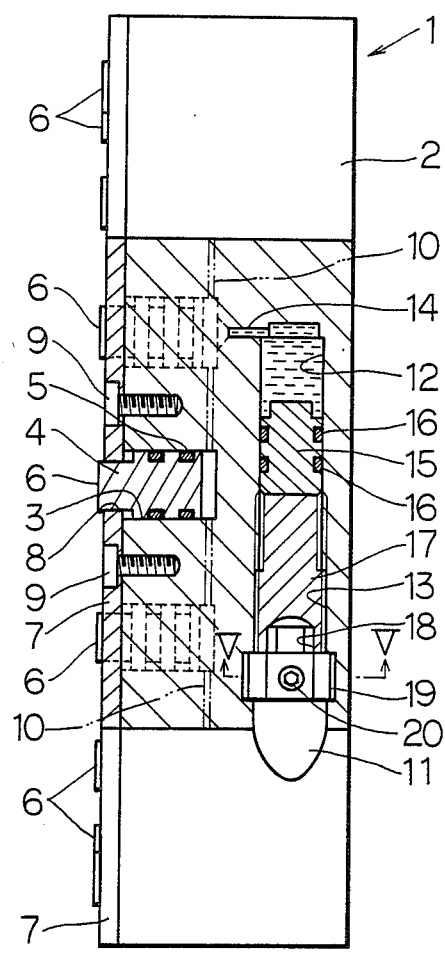
FIG. 4 is a sectional view taken in line IV—IV of FIG. 2.
Figure 5:
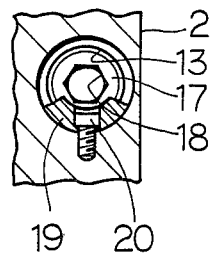
FIG. 5 is a sectional view taken in line V—V of FIG. 4.

A pusher 1 of the embodiment, as clearly seen in FIG. 2 and FIG. 3, comprises an annular body 2, and a number of piston hole 3 bored on a front surface of the body 2 at equally spaced positions along the axial direction of the body 2. In each piston hole 3 is slidably fitted a piston 4 with an O-ring 5 fitted to a circumferential groove on a circumferential surface thereof. An annular cover plate 7 provided with piston holes 8 of small diameter is overlaid on the front surface of the body 2 and fixed using a number of bolts 9. Each of the piston holes 8 of the cover plate 7 is communicated with each piston hole 3 of the body 2. A front end portion 6 with small diameter of each piston 4 is inserted in the piston hole 8 of the cover plate 7, and a front end surface of spherical form of each piston 4 extends in front of the cover plate 7. An annular oil passage 10 communicated with a bottom portion of each piston hole 3 is formed within the body 2. As shown in FIG. 2 and FIG. 4, holes 11 are bored at two positions on outer circumferential surface of the body 2, and part of each hole 11 at bottom side is formed as a pressure chamber 12 and part of each hole 11 at opening side is formed as a threaded hole 13. A bottom portion of each pressure chamber 12 is communicated with the oil passage 10 through a small hole 14, and a piston 15 with an O-ring 16 fitted to a circumferential groove on a circumferential surface thereof is slidably fitted in each pressure chamber 12. A threaded shaft 17 is threadably fitted to each threaded hole 13, and a top end surface of spherical form of each threaded shaft 17 abuts on a base end surface of each piston 15. A stopper 19, as clearly seen in FIG. 4 and FIG. 5, is fixed to opening position of each threaded hole 13 using a bolt 20, and a base end surface with a hexagon hole 18 of the threaded shaft 17 abuts on the stopper 19. Total cross-sectional area of all piston holes 3 is set to about 20 times as large as cross-sectional area of each pressure chamber 12, and oil is filled in the bottom portion of each piston hole 3, the oil passage 10, each small hole 14 and each pressure chamber 12. If any of the threaded shafts 17 is threadably advanced towards the pressure chamber 12 and the piston 15 is pushed by the threaded shaft 17 to bottom side of the pressure chamber 12, the piston 4 on the front surface of the body 2 is pushed forwards through the oil by force of about 20 times as large as the advancing force of the threaded shaft 17 or the piston 15.

When a cutter 26 of the steel plate slitter is pushed and tightened using the pusher 1, as shown in FIG. 6, the pusher 1 is fitted between spacers 28, 29 of arbors 21, 22, and a rear surface of the pusher 1 abuts on the rear spacer 28 and the front end surface of each piston 4 extending in front of the pusher 1 abuts on the front spacer 29. Further a rotation tool such as a torque wrench is engaged with the hexagon hole 18 of the threaded shaft 17 of the pusher 1, and the threaded shaft 17 is threadably advanced towards the pressure chamber 12 by the rotation of the tool and the piston 15 is pushed to bottom side of the pressure chamber 12. Then each piston 4 on the front surface of the pusher 1 is pushed forwards thereby the spacers 29, 25, 28, and the cutters 26 are pushed and each cutter 26 grasped between the spacers 25, 25 or between the spacers 25, 29 is pushed from both sides and tightened.

During the tightening, each piston 4 applies pressure to the oil in the oil passage 10 and the oil opposes against the pressure by reaction force being uniform in all directions. For example, even if the piston abutting surface of the spacers 29 or the cutter abutting surface of the spacer 25, 29 is not perpendicular to the arbor axial direction but slanted and therefore the pushing force of each piston 4 is different, the pistons 4 move forwards or rearwards and position of each piston 4 abutting on the spacer 29 is adjusted, and all of the pistons 4 opposed by the oil at the uniform reaction force abut on the piston abutting surface of the spacer 29 uniformly, thereby the cutter 26 is tightened by uniform force and fixed perpendicular to the arbors 21, 22.

Moreover, since the pressure multiplying circuit or booster circuit to advance the piston 4 by force of about 20 times as large as the advancing force of the threaded shaft 17 is constituted in the pusher 1, the threadable advancing of the threaded shaft 17 is easy without requiring large force, and the pushing force of each piston 4 hence the tightening force of the cutter 26 can be easily increased. Accordingly, the tightening force of the cutter 26 can be increased well, and much trouble is not required for adjusting the gap between the upper and lower cutters 26, 26.

Figure 1:
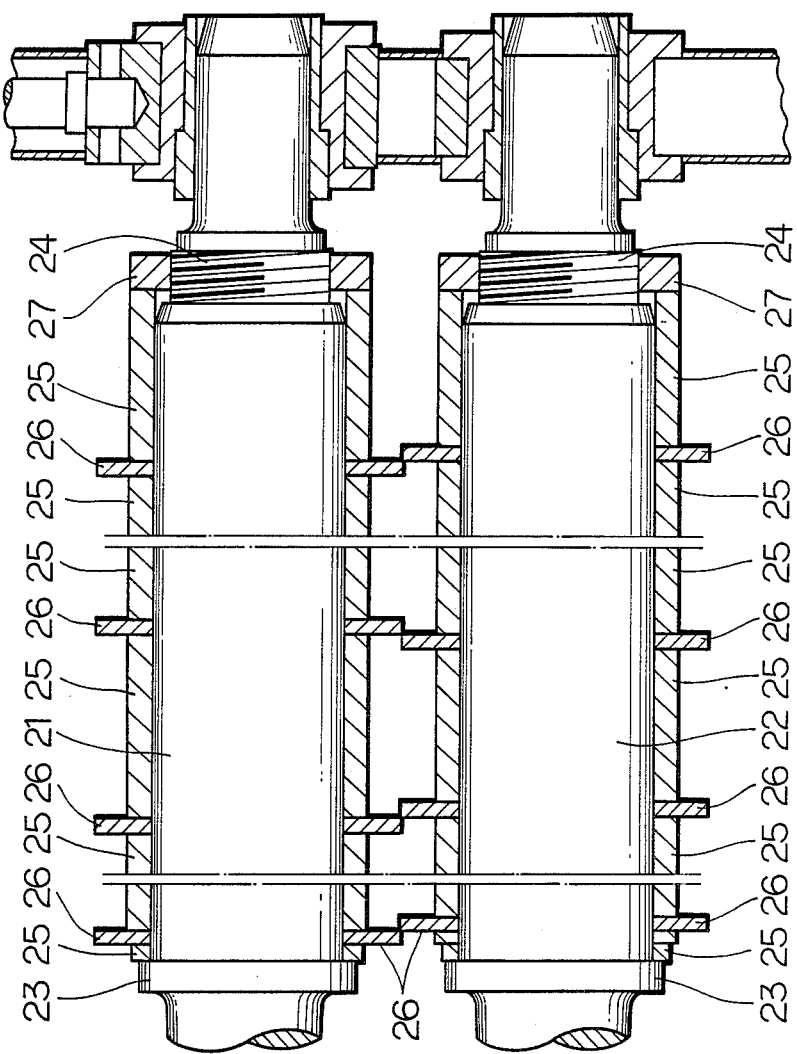
FIG. 1 is a front view partly in section of a steel plate slitted in the prior art.

In FIG. 6, like parts to those in FIG. 1 are designated by the same reference numerals and the descriptions shall be omitted.

The pusher 1 of the embodiment can be used not only in the above case to tighten the cutter 26 of the steel plate slitter, parts of a machine, but also in other various cases, so that an object such as a work for a machine tool abutting on the front end of each piston 4 can be easily pushed uniformly at large force.

What I claim is:

1. A pusher comprising:

a body being formed in an annular shape and having an annular front surface and an outer circumferential surface;

a plurality of piston holes provided on said annular front surface of said body;

a first piston slidably fitted in each of said piston holes and a front end of each of said pistons extending outwardly of said annular front surfaces of said body;

an oil passage provided in said body in communication with a bottom portion of each of said piston holes;

a pressure chamber provided in said body and communicating with said oil passage;

a second piston slidably fitted in said pressure chamber;

a threaded hole provided on said outer circumferential surface of said body and communicating with said pressure chamber;

a threaded shaft threadably fitted to said threaded hole and having a top end abutting on said second piston and having a base end adapted to be engaged with advancing of said threaded shaft;

oil provided in the bottom portion of each piston hole, the oil passage and the pressure chamber;

a pressure multiplying circuit in which the total cross-sectional area of all of said piston holes is set larger than the cross-sectional area of said pressure chamber;

said second piston is adapted to be pushed by said threaded shaft, and said first pistons are adapted to be pushed forwardly out of said annular front surface of said body through the oil by the threadable advancing of said threaded shaft with a force greater than the advancing force of the threaded shaft.

2. A force exerting assembly as set forth in claim 1, wherein the axis of each of said first piston holes is disposed along the axial direction of said body.

3. A force exerting assembly as set forth in claim 1, wherein said first piston holes are disposed at equally spaced positions around the axis of said body.

4. A force exerting assembly as set forth in claim 2, wherein said first piston holes are disposed at equally spaced positions around the axis of said body.

5. A force exerting assembly comprising:

support means;

a body mounted for movement on said support means, said body being formed in an annular shape and having an annular front surface and an outer circumferential surface;

a plurality of piston holes provided on said annular front surface of said body;

a first piston slidably fitted in each of said piston holes and a front end of each of said pistons extending outwardly of said annular front surface of said body;

an oil passage provided in said body in communication with a bottom portion of each of said piston holes;

a pressure chamber provided in said body and communicating with said passage;

a second piston slidably fitted in siad pressure chamber;

a threaded hole provided on said outer circumferential surface of said body and communicating with said pressure chamber;

a threaded shaft threadably fitted to said threaded hole and having a top end abutting on said second piston and having a base end adapted to be engaged with advancing of said threaded shaft;

oil provided in the bottom portion of each piston hole, the oil passage and the pressure chamber;

a pressure multiplying circuit in which the total cross-sectional area of all of said piston holes is set larger than the cross-sectional area of said pressure chamber;

said second piston is adapted to be pushed by said threaded shaft, and said first pistons are adapted to be pushed forwardly out of said annular front surface of said body through the oil by the threaded advancing of said threaded shaft with a force greater than the advancing force of the threaded shaft.

6. A pusher as defined in claim 5, wherein said support means comprises an arbor of a steel plate slitter to which annular cutters are fitted.

* * * * *